US011651159B2

(12) United States Patent
Mazzoleni et al.

(10) Patent No.: US 11,651,159 B2
(45) Date of Patent: May 16, 2023

(54) SEMI-SUPERVISED SYSTEM TO MINE DOCUMENT CORPUS ON INDUSTRY SPECIFIC TAXONOMIES

(71) Applicant: INTERNATIONAL BUSINESS MACHINES CORPORATION, Armonk, NY (US)

(72) Inventors: Pietro Mazzoleni, New York, NY (US); Wesley M Gifford, Ridgefield, CT (US); Elham Khabiri, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 16/289,708

(22) Filed: Mar. 1, 2019

(65) Prior Publication Data

US 2020/0279171 A1    Sep. 3, 2020

(51) Int. Cl.
*G06N 5/02*       (2023.01)
*G06F 40/30*      (2020.01)
*G06N 5/022*      (2023.01)
*G06F 16/901*     (2019.01)
*G06F 16/9538*    (2019.01)
*G06N 20/00*      (2019.01)
(Continued)

(52) U.S. Cl.
CPC .......... *G06F 40/30* (2020.01); *G06F 16/9024* (2019.01); *G06F 16/9035* (2019.01); *G06F 16/9538* (2019.01); *G06F 18/2193* (2023.01); *G06N 5/022* (2013.01); *G06N 20/00* (2019.01)

(58) Field of Classification Search
CPC ........ G06N 5/022; G06N 20/00; G06N 5/003; G06F 16/9024; G06F 16/9035; G06F 16/9538; G06F 40/30; G06F 16/36; G06F 40/20; G06K 9/6265
See application file for complete search history.

(56) References Cited

U.S. PATENT DOCUMENTS 5,895,470 A    4/1999   Pirolli et al.
7,496,567 B1   2/2009   Steichen
(Continued)

FOREIGN PATENT DOCUMENTS

EP    0687987 A1    12/1995
EP    3173983 A1     5/2017

OTHER PUBLICATIONS

Godbole et al., "Building re-usable Dictionary Repositories for real-world text Mining", Abstract, CIKM'10, Oct. 26-30, Toronto, Ontario, Canada, pp. 1189-1198.
(Continued)

*Primary Examiner* — Sanchita Roy
(74) *Attorney, Agent, or Firm* — Steven M. Bouknight

(57) ABSTRACT

A method, computer system, and a computer program product for generating a custom corpus is provided. The present invention may include generating a domain graph. The present invention may also include gathering seed data based on the generated domain graph. The present invention may then include identifying domain related data based on the gathered seed data. The present invention may further include querying the domain related data. The present invention may also include creating word embeddings for the domain related data. The present invention may then include evaluating the domain related data.

17 Claims, 5 Drawing Sheets

(51) Int. Cl.
    *G06F 16/9035*    (2019.01)
    *G06F 18/21*    (2023.01)

(56) References Cited

U.S. PATENT DOCUMENTS

| | | | |
|---|---|---|---|
| 8,676,564 | B2 | 3/2014 | Nasukawa et al. |
| 9,361,293 | B2 | 6/2016 | Bustelo et al. |
| 10,007,755 | B2 | 6/2018 | Sanchez et al. |
| 2006/0206483 | A1 | 9/2006 | Knepper et al. |
| 2017/0161363 | A1 | 6/2017 | Cortis et al. |
| 2017/0213130 | A1 | 7/2017 | Khatri et al. |
| 2017/0228438 | A1* | 8/2017 | Chavez .................. G06N 5/022 |
| 2018/0082197 | A1 | 3/2018 | Aravamudan et al. |
| 2018/0232443 | A1* | 8/2018 | Delgo .................. G06F 40/295 |
| 2019/0005049 | A1* | 1/2019 | Mittal .................. G06F 16/316 |

OTHER PUBLICATIONS

Calado et al., "Combining Link-Based and Content-Based Methods for Web Document Classification", Abstract, CIKM'03, Nov. 3-8, 2003, New Orleans, Louisiana, USA, pp. 394-401.

Manevitz et al., "One-Class SVMs for Document Classification", Journal of Machine learning research 2 (2001) 139-154, Submitted Mar. 2001; Published Dec. 2001, Abstract.

Mell et al., "The NIST Definition of Cloud Computing", Recommendations of the National Institute of Standards and Technology, Special Publication 800-145, Sep. 2011, 7 pages.

Roy et al., "Learning Domain-Specific Word Embeddings from Sparse Cybersecurity Texts", arXiv:1709.07470v1 [cs.CL] Sep. 21, 2017, Abstract, Copyright © 2018, Association for the Advancement of Artificial Intelligence (www.aaai.org), 8 pages.

Wang et al., "Baselines and Bigrams: Simple, Good Sentiment and Topic Classification", Proceedings of the 50th Annual Meeting of the Association for Computational Linguistics, pp. 90-94, Jeju Republic of Korea, Jul. 8-14, 2012.

http://www.plainsbuilders.com/ipin35/IPIN2/CSIDivisions.asp, "CSI MasterFormat™ Division List", Click on a division number to go directly to that division. Accessed on Feb. 28, 2019, 5 pages.

Auer et al., "Finite-time Analysis of the Multiarmed Bandit Problem*", Machine Learning, vol. 47, pp. 235-256,2002.

Guha et al., "Multi-Armed Bandit Problems with Delayed Feedback", arXiv:1011.1161v3, Jun. 18, 2013, 16 pages, https://arxiv.org/pdf/1011.1161.pdf.

* cited by examiner

SEMI-SUPERVISED SYSTEM TO MINE DOCUMENT CORPUS ON INDUSTRY SPECIFIC TAXONOMIES

BACKGROUND

The present invention relates generally to the field of computing, and more particularly to data mining and natural language processing (NLP). Word embeddings may be used to capture the meaning of a term in many NLP applications. Word embeddings may map the captured term to a numerical vector representation to find terms with similar meanings associated with similar vector representations. An effective assignment of a word embedding representation to each term may require training on a large corpus of relevant documents, however, a corpus of relevant documents may not be available for specific industries.

SUMMARY

Embodiments of the present invention disclose a method, computer system, and a computer program product for generating a custom corpus. Embodiments of the present invention may include generating a domain graph. Embodiments of the present invention may also include gathering seed data based on the generated domain graph. Embodiments of the present invention may then include identifying domain related data based on the gathered seed data. Embodiments of the present invention may further include querying the domain related data. Embodiments of the present invention may also include creating word embeddings for the domain related data. Embodiments of the present invention may then include evaluating the domain related data.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
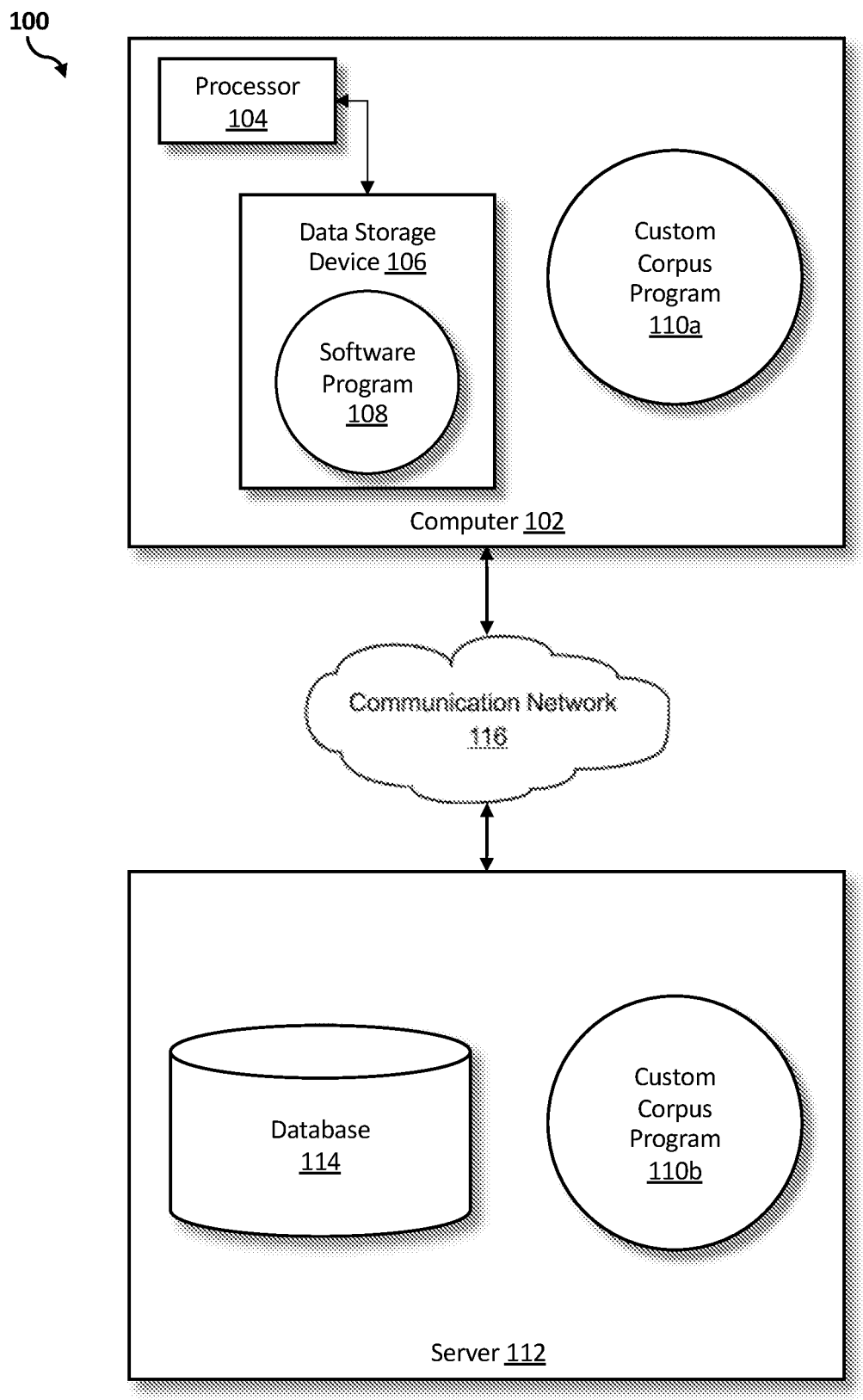
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for building a custom corpus. As such, the present embodiment has the capacity to improve the technical field of data mining by generating custom corpora. More specifically, a custom corpus of data will narrow a dataset to create relevant domain specific data to query. A graph structure is created and populated by initial corpora, an iterative semi-supervised enhancement model analyzes the created graph to model classification boundaries and the analysis continues in one or more loops until a stopping criteria has been determined to generate highly relevant data and documents for an industry specific taxonomy.

As previously described, the present invention relates generally to the field of computing, and more particularly to data mining and natural language processing (NLP). Word embeddings may be used to capture the meaning of a term in many NLP applications. Word embeddings may map the captured term to a numerical vector representation to find terms with similar meanings associated with similar vector representations. An effective assignment of a word embedding representation to each term may require training on a large corpus of relevant documents, however, a corpus of relevant documents may not be available for specific industries.

Data mining may include a process of extracting data from larger datasets. Datasets may be stored on a database or a corpus and data may be mined for industry specific taxonomies. Structured and unstructured data may be mined from various industry specific corpora using natural language processing (NLP) techniques and word embedding. Industry specific corpora datasets and data may include, for example, industry 4.0 data, telecommunication data, medical data, financial data, legal data, legislative data, business data, transportation data, agriculture data or industrial data.

Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. NLP may process the data to extract information that is meaningful to a particular industry, such as extracting information by subject matter or topic. An NLP system may be created and trained by rules or machine learning and word embeddings.

NLP may extract key features using word embedding techniques that map words and phrases to vectors of numbers using mathematical embedding. NLP techniques may organize knowledge using industry specific word embeddings to associate words together that emanate from the same or similar context. Word embeddings may create an understanding of the occurrence of words or terms in a document corpus. When words and phrase embeddings are used, the NLP accuracy may improve the semantic analysis. Word embeddings may create a more accurate data mining result for deep learning using NLP. Industry specific embeddings may assist with understanding unstructured content in document annotation, semantic searches, log and process mining, content recommendation, question and answer (Q&A) systems and various use cases from different industries.

Semantic analysis may be used to infer the meaning and intent of the words and phrases in the data, both verbal and non-verbal. For example, verbal meaning may be inferred using the spoken word and phrases captured by a microphone from a subject matter expert (SME) verbally inputting and storing notes on an industry specific database (i.e., corpus or knowledgebase). Nonverbal meaning may be inferred using words, sentences or phrases identified in stored documents and unstructured data on an industry specific corpus. Semantic analysis may consider current and historical data associated with a corpus. Current data may be data that is added to a corpus, for example, via an internet of things (IoT) device or from a sensor. Current data may generally refer to, for example, temperature measurements or traffic conditions. Historical data may include, for example, electronic book data stored in a library database under industrial and manufacturing industries. Semantic analysis may also consider syntactic structures at various levels to infer meaning to words, phrases, sentences and paragraphs scanned from a corpus.

NLP algorithms may use data in a corpus as a source to scan the data for pre-defined keywords that may be used for each industry or subject matter. Pre-defined keywords may be entered manually or retrieved from machine learning rules scanning, for example, an oil and gas industry specific document corpus to find words relevant to the word steam. Machine learning (ML) may be incorporated by, for example, analyzing industry 4.0 documents, construction industry master format guidelines, legislative policy data, hospital guidelines, government guidelines or industrial guidelines for an oil and gas industry.

Querying for relevant industry specific data on a search engine that includes an exorbitant amount of data (i.e., phrases, words, documents or databases) may result in more responses than relevant or necessary. For example, querying a search engine for words related to the word steam in the oil and gas industry, the result may include words related to the industry and many words not related to the industry. Current queries may respond with more than one domain context since databases are large and examining every document in a large number of databases may not be feasible.

Selecting industry specific documents and corpora may be challenging when querying for relevant data related to a specific domain. A search engine may be used for general knowledge relating to an industry, however, a search engine may not be suitable for identifying, researching or solving industry specific problems. Custom word embeddings may be built on a specified document corpus that contains well-curated content for an industry that may have extensive documentation on the corpus, however, many industries may not have extensive documentation identified on a particular corpus or corpora. There may also be sub-domains (e.g., asset maintenance or project management) of an industry that may require different word embeddings to generate relevant industry data with a query. Therefore, it may be advantageous to, among other things, narrow the document corpora by relevance to a topic by training a custom model based on domain specific data.

According to at least one embodiment, a document corpus may be built and created for specific subject matter. Narrowing the document corpus may include inputting a taxonomy of terms related to a specific industry domain and using artificial intelligence (AI) to identify relevant documents from public or private repositories (i.e., corpora, databases or knowledgebases). The input taxonomy of terms may be queried from a knowledgebase and a domain context may be narrowed for a refined output or result.

Creating custom knowledge models for industry specific document corpora may generate a unique body of partitioned data as an output. The custom created output may further be analyzed and queried to find relevant domain specific data. Creating a custom knowledge model may include preparing an industry taxonomy as a graph, semantically searching the relevant documents using a semi-supervised algorithm (i.e., iterative semi-supervised enhancement model) to identify relevant documents and creating context metrics for a domain specific industry.

The graph may be created and populated by an initial corpus from a taxonomy and the data may be organized in a graph structure, such as a directed graph. The directed graph may include nodes and edges such that each node represents a taxonomy term and each edge may represent a dependency. Using the nodes of the graph, a semantic query may be made using available repositories or public or private documents. The resulting documents may be used to traverse existing relations in the knowledgebase to define a subgraph.

The graph may be used to determine model classification boundaries by using the semi-supervised ML model, explore and exploit techniques and iterative model generation. At each stage (i.e., loop) of the query, a new ML model may be generated using semi-supervised techniques to leverage word embeddings and other ML models. Semi-supervised learning may use both labeled datasets and unlabeled datasets to train a ML model. Other ML models may include supervised ML and unsupervised ML. Supervised learning may use a labeled dataset to train a ML model. Unsupervised learning may use all unlabeled data to train a ML model. A corpus graph may be generated using a domain specific taxonomy.

A determination may be made regarding the areas of the graph to explore and exploit based on the performance in exploring areas that define a boundary between relevant and not relevant data. For example, at each stage of the query, the new ML models may identify documents relevant to the domain specific taxonomy and may identify documents not relevant to the domain specific taxonomy.

After one or more loops, a stopping criterion or more than one stopping criteria may be determined based on the completeness of the data. An evaluation of the corpus may be used to determine completeness. One evaluation may include analyzing the word embedding that leverages more than one metric, such as word coverage and word context similarity. Word coverage may verify that domain specific terms may have been included in the embedding. Word context may measure how closely the embedding preserves the semantic similarity between related terms. Word context may be derived from an input taxonomy.

For example, an industry 4.0 construction industry database that contains a universal method for organizing project manuals and documents under categories using standardized guidelines that relate drawings to industry specifications. The universal method is organized in a master format based on project documents, such as project manuals and specifications, drawings, product literature, facility management, maintenance documents, projection integration and communication, detailed cost estimating, project accounting and building information models.

The industry 4.0 universal method may be organized as a graph composed of groups, subgroups, divisions and more granular categorizations until the graph reaches a leaf. For example, a subgroup (e.g., Facility Conditions) has 50 divisions, some of which include concrete, metals and thermal and moisture protection. The last division may contain roofing and siding panels as a child node. A seed graph may be produced for the construction database and the seed graph may result in, for example, 100 leaves nodes from a tree data structure. The resulting number of documents relevant documents is 1500, the average semantic context is 0.99 and the normalized average semantic context is 0.13.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a custom corpus program 110a. The networked computer environment 100 may also include a server 112 that is enabled to run a custom corpus program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the custom corpus program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the custom corpus program 110a, 110b (respectively) to create a sub-corpus of data to use for custom domain word embedding. The domain specific corpus method is explained in more detail below with respect to FIG. 2.

Figure 2:
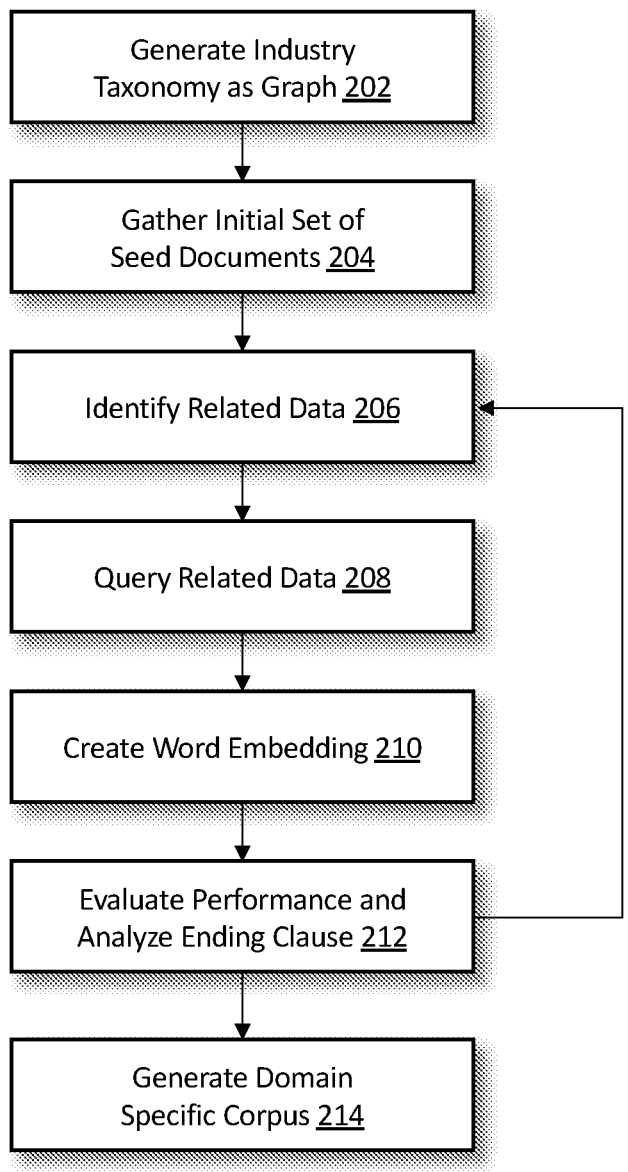
FIG. 2 is an operational flowchart illustrating a process for creating a domain specific corpus according to at least one embodiment.

Referring now to FIG. 2, an operational flowchart illustrating the exemplary domain specific corpus creation process 200 used by the custom corpus program 110a, 110b according to at least one embodiment is depicted.

At 202, an industry taxonomy is generated as a graph. Taxonomy nodes may be extracted and organized as a directed graph. The directed graph may include nodes and edges. In the graph, each node may represent a term in the taxonomy. The edges of the graph may represent dependencies. For example, in an oil and gas industry, the term pump (i.e., a term in the taxonomy) may represent a node and the word submersible pump (i.e., a sub-category of the node term) may represent an edge on the graph.

At 204, an initial set of seed documents are gathered. The initial set of seed documents may be gathered by semantically querying a knowledgebase with nodes (i.e., taxonomies or taxonomy terms) in the graph. Each node may represent a source of documents to learn from, such as a list of industry specific seed documents. The learning documents may also be known as arms (e.g., explore arms). The gathering of initial seed documents may identify as many related document pages (i.e., seed data) as possible to train, using ML, what is in the scope of the specific taxonomy and what is not in the scope of the specific taxonomy being queried. The larger the dataset is in the initial semantic query may assist in identifying what data is in the scope and what data is out of the scope of the queried domain. For example, using a decision tree method to begin classifying the seed information, taxonomy leaves' labels are used to query terms to search a large public repository. Information retrieved from gathering the seed documents may be added to the directed graph which may now contain both taxonomy nodes and seed documents.

At 206, related data is identified. A query is made from the resulting graph produced in step 204. The query may produce and retrieve a selected list of pages to be manually annotated as relevant (i.e., related) or not relevant (i.e., irrelevant or unrelated) to the specified domain. Various query techniques may be used to identify relevant data (e.g., relevant documents) and non-relevant data (e.g., not relevant documents), such as stratified sampling or multistage sampling. Stratified sampling may include sampling sub-domains or subgroups by dividing or partitioning the data samples into subgroups before querying. Multistage sampling may include sampling clusters. The clusters may be partitioned before sampled. The output of the manual annotation may be fed back into the graph as nodes annotations ground truth.

Manually annotating relevant data may be accomplished by an individual knowledgeable in the domain. One or more ML algorithms may be initiated to find related data. Unsupervised ML may collect and model data to form a structure using the collected data. Supervised ML may use a training set (i.e., labeled training set, training dataset or training data) to build a model that imitates behavior in the ground truth. Ground truth may represent the accuracy of data by the classification of data or data labels (i.e., labeled dataset). A ML model may be built using one or more datasets and a training dataset may train the ML model. A semi-supervised ML strategy with ground truth may include, for example, manual annotation of the output.

A term (e.g., a word) may infer multiple different meanings and contexts as related to differing domains, therefore, the term may need to be disambiguated to the true meaning of the term in the context of the best use of the term. The best use of the term may depend on the specific domain being queried. Building ground truth may disambiguate words and phrases for determining data that may be relevant to the queried domain. Ground truth may be employed using a feedback method based on the manual annotation, such as annotations from a subject matter expert over the specified domain.

For each iteration, a number of pages may be retrieved from the repository using taxonomy labels as the query. The retrieved pages may be candidate relevant pages (i.e., a determination has not been made if candidate pages reflect the meaning of the query in the context of the query). For example, when the term, fatigue, is used as a query, the query may retrieve either documents about mechanical fatigue of a pump or documents about fatigue as a human status or condition.

Candidate nodes may be classified as relevant or not relevant to the industry using a classification model. The classification model may leverage, identify and find relevant and not relevant data to be used in semi-supervised ML. For example, semi-supervised techniques may include positive and unlabeled learning (PU learning) or pseudolearning. PU learning may create a larger ML training set of data based on margins and may be useful in classifying unlabeled datasets. Pseudo labeling may label the data on an approximate bases, as opposed to manual labeling.

At 208, related data is queried. Explore and exploit techniques may be adopted and used on graphs to select candidate pages (i.e., documents) to be added to the industry corpus. Explore and exploit techniques may include, for example, explore arms that include greedy based approaches, multi-arm algorithms or reinforcement learning techniques. The greedy based approach may include an algorithm to identify optimal query choices at each phase of the query. Reinforcement learning may utilize ML to identify the best path to maximize optimal solutions.

For example, the explore and exploit techniques may choose further documents for analysis using the structure of the repository graph. Nodes in the repository graph that contain a larger number of relevant pages (e.g., best category strategy) may be used as a target category to choose more documents from. The categories with a larger number of relevant and irrelevant pages (e.g., best worst category strategy) may be used as a target category to choose a next set of documents from.

Explore and exploit techniques may leverage graph structures to identify and choose which new document or data to evaluate at each step towards maximizing the performance of the classifier. A large number of documents may be potentially relevant to an industry and the custom corpus program 110a, 110b may utilize multiple techniques to effectively traverse the space balancing between explore approaches and exploit approaches. An explore approach may search for documents from an unexplored space or database. An explore only approach may have difficulty in learning proper classifications as explore only may jump from different sets of potentially unrelated data. An exploit approach may select documents similar to already classified documents. An exploit only approach may provide conservative ML within a broad set of data.

Explore arms may be used to learn decision boundaries between relevant and not relevant data. Identifying and choosing the type of explore arm to use may depend on the explore-exploit strategies. Arms may be defined as the leaves (i.e., outer node, external node or leaf node) of the original taxonomy or another type of node (i.e., inner node or branch node) in the graph. For example, a large public database stores data from various domains as separate categories and the data is accessible based on choosing one or more categories. A graph may be built by accessing and leveraging the data in a large public database and the generated arm nodes may be used based on the categories.

Once an arm type is selected, a document (i.e., data, dataset or domain data) is identified and selected. A breadth-first approach may be used and may begin at the root of the graph and briefly explore neighbor nodes at a lighter depth before moving to a deeper node analysis. The breadth-first approach may use a subset of documents directly linked to the graph. Once the documents identified and selected for the breath-first approach are analyzed, and no other documents are queued for analysis, the custom corpus program 110a, 110b may continue traversing the graph (i.e., going deep and deeper into analysis) by selecting more documents indirectly related or indirectly linked to the arm node. For example, the indirect documents selected for analysis are 2 hops or 3 hops away from the direct set of documents (e.g., the first subset of documents gathered after choosing which arm to use).

Choosing the documents to analyze may also use a depth-first approach. A depth first approach may traverse the graph beginning at the node and analyzing a whole branch before backtracking back to the node. In some implementations, a breadth-first approach and a depth-first approach may co-exist. For example, the first level of exploration a breath-first approach is used and the next levels are explored using a depth-first method.

Cycles of exploration and cycles of exploitations may be repeated. The cycles may include one or more phases. One phase may be an explore phase and another phase may be an exploit phase. Each phase may be operated in either order, such as an initial explore phase and then a secondary exploit phase. An initial phase may explore by randomly selecting categories to identify arms that may yield consistent positive (i.e., relevant) or consistent negative (i.e., not relevant) documents. This phase may repeat for a specified number of cycles or when a given number of consecutive cycles have not been accepted due to poor performance. For example, a specified number of cycles provided at the input of the search and exploration phase or at the input of the beginning of the custom corpus program 110a, 110b.

A second phase may exploit highly positive arms and highly negative arms to identify areas of the graph that show the performance is, or is becoming, more mixed. A mixed area of the graph may indicate a place that the decision boundary may lie (i.e., may not be accurate). In a mixed area of the graph, graph sparsity and density analytic techniques may be identified, leveraged and used. For example, the algorithm could favor nodes (e.g., categories) with a larger number of child nodes.

At 210, a word embedding is created. The related documents identified at step 208 may be used for the domain specific word embedding. The word embedding may be a first word embedding process or a new (i.e., rebuilt) word embedding process. Word embedding may be evaluated based on different metrics that measure how close the embedding represents the specified domain. Word embedding techniques may be used to leverage relevant page or data identifiers, such as Word2Vec, Sent2Vec or Doc2Vec.

Applications that may use domain specific word embedding include, for example, semantic searches, document annotation, log and process mining or content recommendation. Semantic searches may retrieve all semantically relevant pages given a specific query. Document annotation may assign related tags to each document, for example, document1 is tagged with plumbing, water fountain, steam and second floor. Semantic searching may enable natural language searches for data, such as industry specific data in industry 4.0 domain documents. Semantic searches may be used with industry 4.0 domain documents, for example, to infer meaning to or to understand the query submitted by field workers in the context of the domain. The semantic search may also assist in identifying relevant documents using accurate search parameters.

Documentation annotation applications may automatically organize project documents, such as documents with the same annotations are considered to be in the same group. An automatic approach to organize industry domain specific standards, as opposed to manually curated folders for organizing project documents, for example, may create a more effective and efficient way for project managers and field workers to lead and manage complex projects.

Log and process mining may identify entities (e.g., parts, failure types and actions) to help extract a process of repair, using given log data. Content recommendation may include knowledge that will help retrieve relevant items of interest. Maintenance logs that may not be manually curated with data labeling may be annotated. Industry relevant documents (e.g., Industry 4.0) may be linked to a taxonomy produced by the custom corpus program 110a, 110b and may be used to automatically, without additional labeling, annotate maintenance log documents around industry standard terms. For example, field workers may use the annotated maintenance logs to quickly and efficiently learn the maintenance history tasks of a particular asset, common patterns across the assets and how to quickly find an appropriate solution. An additional example may include data scientists that may use the annotations to identify events, such as process upsets), that may be the target of an AI prediction algorithm.

At 212, the performance is evaluated, and an ending clause is analyzed. At each loop, new documents classified as relevant domain specific data (i.e., industry specific) may be evaluated. Multiple evaluation criteria may be used at each loop. One evaluation criterion may include analyzing the accuracy of the classification algorithm. The classification algorithm analysis may include setting aside part of the training dataset and using the set aside section as a validation set. The analysis may be a statistical approach and may include, for example, the holdout method. The holdout method may cross validate the partitioned training dataset. The holdout process may repeatedly partition the original training dataset into a training dataset and a validation dataset (i.e., cross-validation).

After each iteration, an evaluation step may compare the new version of the word embedding with the previous version of the word embedding. If the quality of the evaluation step is not improved, then the newly generated word embedding may be ignored and the iteration may continue with the old word embedding version. The quality of the classifier may also be compared similarly, for example, if the F-score (i.e., harmonic average) of the newly generated classifier is not improved, then the newly labeled pages may be set back to an unknown status.

One other evaluation criterion may include analyzing the accuracy of the generated embedding. Ground truth may be used by composing of a collection of domain specific terms, for example, terms identified from a standard taxonomy or terms collected via SMEs. The words or domain specific terms collected may emanate from the same or similar contexts by, for example, calculating or computing multiple metrics for newly generated vector embedding.

One metric may include coverage of the term, such as analyzing if the term exists in a word embedding technique (e.g., word2vec model). One other metric may include context similarity. Context similarity may specify if the vector representation of the similar concepts in the ground truth are close or similar using cosine similarity. Normalized context similarity may combine the coverage metric with the context similarity metric. Normalized context similarity may be calculated by multiplying the context similarity metric by the normalized coverage (i.e., the coverage divided by the total number of terms). The calculation may indicate the consolidate metrics on the embedding ability to cover industry terms while preserving the context similarity.

At each iteration, the normalized context similarity of the new model against the previous model may be compared and a decision may be made using a threshold value, such as a predetermined threshold. The decision may include accepting the step, ignoring the step or to exit the loop. If the evaluation metric shows no improvements for the new word embedding, the new word embedding may be discarded (i.e., as if no new iteration was evaluated). To ensure that the discarded pages are not retrieved again since the discarded pages were established as not improving the embedding, the discarded pages may be labeled as documents that have been seen (e.g., been previously analyzed or queried).

During evaluation, one outcome of the word embedding process at 210 may discard the word embedding and pass the data back to step 206 to be used to select new candidate pages (i.e., data) to be evaluated, thus beginning a new loop cycle. One other word embedding outcome upon evaluation may include accepting the word embedding at 210. The newly classified data (i.e., relevant or not relevant) may be added to the ground truth and then be transmitted back to step 206. The custom corpus program 110a, 110b may store the accepted embedding into a graph and use the custom word embeddings to select new candidate pages to be evaluated, thus also beginning a new loop cycle. Another outcome may include ending the process.

At 214, a domain specific corpus is generated. Ending the loop process at step 212 may trigger the custom corpus program 110a, 110b to generate a new corpus of domain specific data by tagging the documents (e.g., all documents) as relevant and returning them as the domain corpus. The last embedding created from the documents may also be stored and used for classification and search use-cases.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
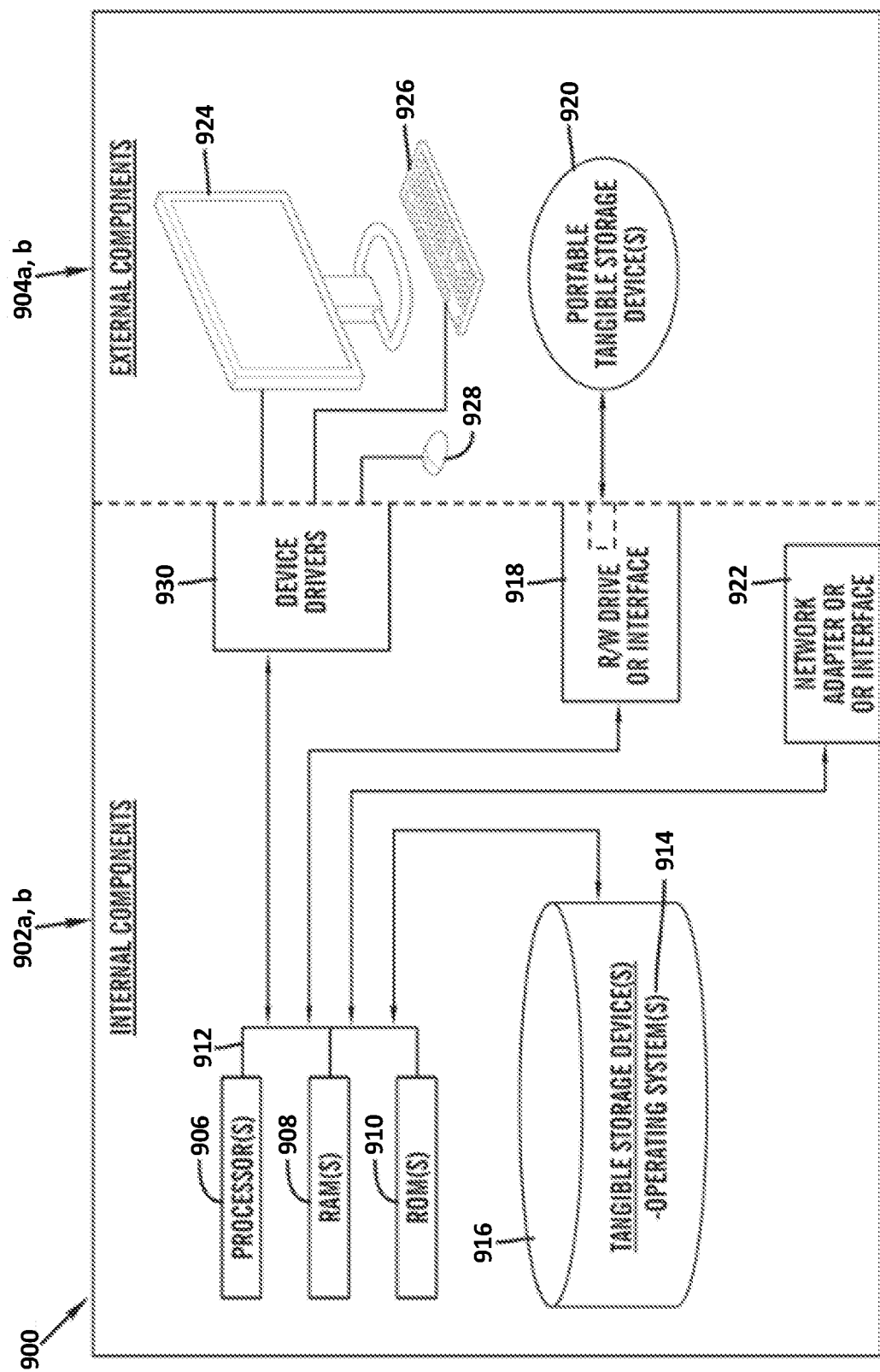
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the custom corpus program 110a in client computer 102, and the custom corpus program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the custom corpus program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the custom corpus program 110a in client computer 102 and the custom corpus program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the custom corpus program 110a in client computer 102 and the custom corpus program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
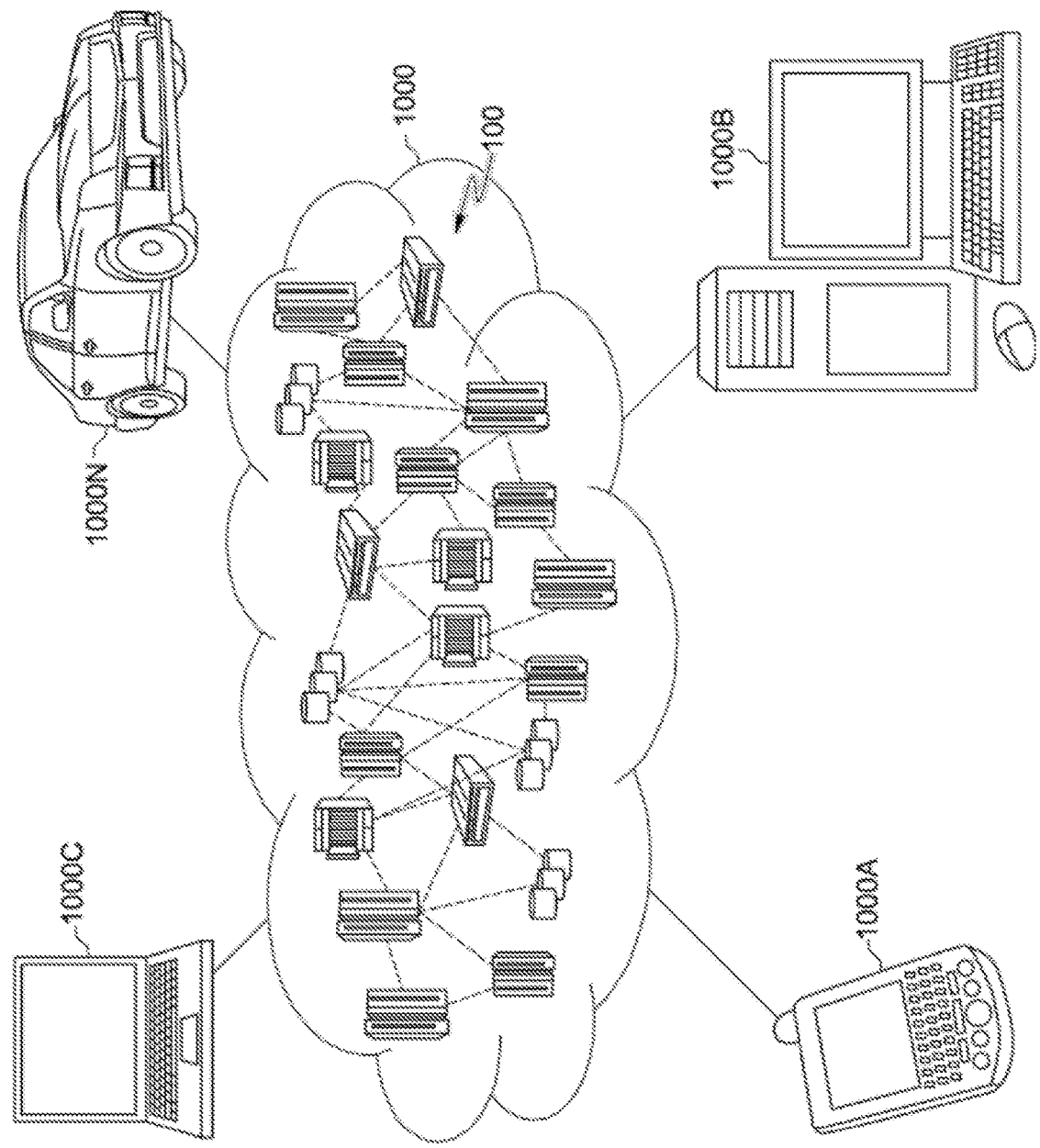
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
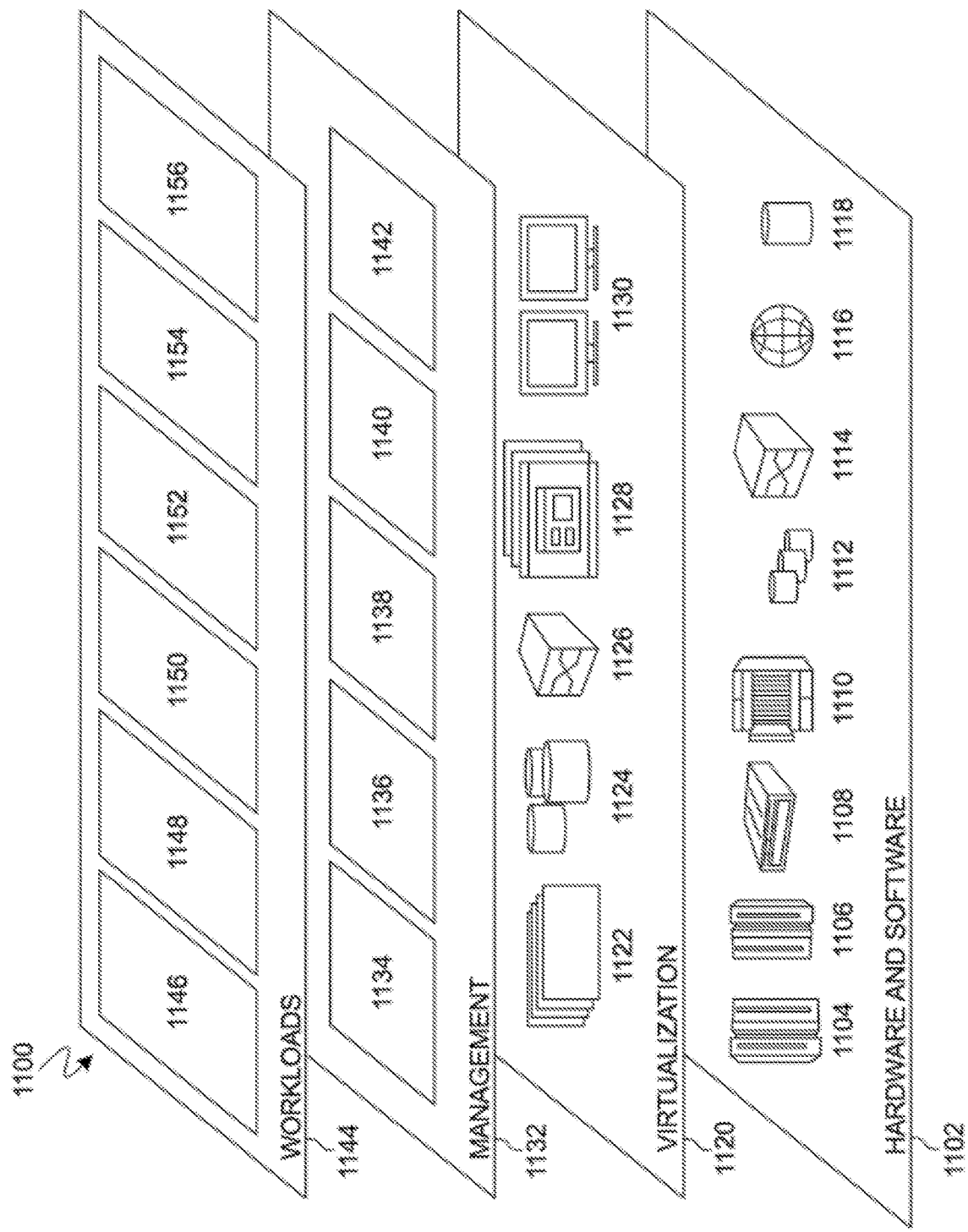
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and corpus creation 1156. A custom corpus program 110a, 110b provides a way to generate a custom corpus to mine for relevant domain specific data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a custom corpus, the method comprising:
generating a domain graph comprising nodes representing terms associated with an industry taxonomy;
gathering seed data based on the generated domain graph by querying a knowledgebase using the nodes in the domain graph;
identifying domain related data based on the gathered seed data, wherein identifying the domain related data further comprises establishing a ground truth for the terms such that a true meaning of a term is determined according to a context of a respective domain associated with the industry taxonomy and further comprises identifying relevant and irrelevant data to a domain associated with the industry taxonomy based on the ground truth;

querying the domain related data and identifying other terms and candidate data to add to the industry taxonomy based on the query and relevancy to respective domains;

creating word embeddings for the terms associated with the domain related data;

evaluating the domain related data in one or more loops based on a plurality of evaluation criteria, wherein the plurality of evaluation criteria comprises determining and evaluating word coverage, context, and accuracy of the created word embeddings, and wherein evaluating the domain related data in one or more loops further comprises comparing at each loop a new version of a word embedding with a previous version of the word embedding to determine whether quality of the word embedding is improved based on the plurality of evaluation criteria; and generating the custom corpus comprising the domain related data in response to detecting no further improvements to the created embeddings based on the plurality of evaluation criteria.

2. The method of claim 1, further comprising:
based on the evaluated domain related data, determining a completeness of the domain related data; and
in response to determining a completeness of the domain related data, generating a domain specific corpus of relevant data.

3. The method of claim 1, wherein the seed documents are gathered by querying the knowledgebase, a database or a corpus.

4. The method of claim 1, wherein the domain related data is a set of data gathered to represent an industry specific taxonomy.

5. The method of claim 1, wherein the domain related data is identified using the machine learning algorithms comprising semi-supervised machine learning, supervised machine learning and unsupervised machine learning.

6. The method of claim 1, wherein the domain related data is evaluated by analyzing the accuracy of a classification algorithm and a statistical analysis, wherein the evaluation results in a generated algorithm that is compared to a validation dataset.

7. A computer system for generating a custom corpus, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
generating a domain graph comprising nodes representing terms associated with an industry taxonomy;
gathering seed data based on the generated domain graph by querying a knowledgebase using the nodes in the domain graph;
identifying domain related data based on the gathered seed data, wherein identifying the domain related data further comprises establishing a ground truth for the terms such that a true meaning of a term is determined according to a context of a respective domain associated with the industry taxonomy and further comprises identifying relevant and irrelevant data to a domain associated with the industry taxonomy based on the ground truth;

querying the domain related data and identifying other terms and candidate data to add to the industry taxonomy based on the query and relevancy to respective domains;

creating word embeddings for the terms associated with the domain related data;

evaluating the domain related data in one or more loops based on a plurality of evaluation criteria, wherein the plurality of evaluation criteria comprises determining and evaluating word coverage, context, and accuracy of the created word embeddings, and wherein evaluating the domain related data in one or more loops further comprises comparing at each loop a new version of a word embedding with a previous version of the word embedding to determine whether quality of the word embedding is improved based on the plurality of evaluation criteria; and generating the custom corpus comprising the domain related data in response to detecting no further improvements to the created embeddings based on the plurality of evaluation criteria.

8. The computer system of claim 7, further comprising:
based on the evaluated domain related data, determining a completeness of the domain related data; and
in response to determining a completeness of the domain related data, generating a domain specific corpus of relevant data.

9. The computer system of claim 7, wherein the seed documents are gathered by querying the knowledgebase, a database or a corpus.

10. The computer system of claim 7, wherein the domain related data is a set of data gathered to represent an industry specific taxonomy.

11. The computer system of claim 7, wherein the domain related data is identified using the machine learning algorithms comprising semi-supervised machine learning, supervised machine learning and unsupervised machine learning.

12. The computer system of claim 7, wherein the domain related data is evaluated by analyzing the accuracy of a classification algorithm and a statistical analysis, wherein the evaluation results in a generated algorithm that is compared to a validation dataset.

13. A computer program product for generating a custom corpus, comprising:
one or more computer-readable storage media and program instructions stored on at least one of the one or more computer-readable storage media, the program instructions executable by a processor to cause the processor to perform a method comprising:
generating a domain graph comprising nodes representing terms associated with an industry taxonomy;
gathering seed data based on the generated domain graph by querying a knowledgebase using the nodes in the domain graph;
identifying domain related data based on the gathered seed data, wherein identifying the domain related data further comprises establishing a ground truth for the terms such that a true meaning of a term is determined according to a context of a respective domain associated with the industry taxonomy and further comprises identifying relevant and irrelevant data to a domain associated with the industry taxonomy based on the ground truth;

querying the domain related data and identifying other terms and candidate data to add to the industry taxonomy based on the query and relevancy to respective domains;

creating word embeddings for the terms associated with the domain related data; and evaluating the domain related data in one or more loops based on a plurality of evaluation criteria, wherein the plurality of evaluation criteria comprises determining and evaluating word coverage, context, and accuracy of the created word embeddings, and wherein evaluating the domain related data in one or more loops further comprises comparing at each loop a new version of a word embedding with a previous version of the word embedding to determine whether quality of the word embedding is improved based on the plurality of evaluation criteria; and generating the custom corpus comprising the domain related data in response to detecting no further improvements to the created embeddings based on the plurality of evaluation criteria.

14. The computer program product of claim 13, further comprising:

based on the evaluated domain related data, determining a completeness of the domain related data; and in response to determining a completeness of the domain related data, generating a domain specific corpus of relevant data.

15. The computer program product of claim 13, wherein the seed documents are gathered by querying the knowledgebase, a database or a corpus.

16. The computer program product of claim 13, wherein the domain related data is a set of data gathered to represent an industry specific taxonomy.

17. The computer program product of claim 13, wherein the domain related data is identified using the machine learning algorithms comprising semi-supervised machine learning, supervised machine learning and unsupervised machine learning.

* * * * *